(12) United States Patent
Mostafa et al.

(10) Patent No.: US 7,110,732 B2
(45) Date of Patent: Sep. 19, 2006

(54) SUBSAMPLING RF RECEIVER ARCHITECTURE

(75) Inventors: Mohamed A. I. Mostafa, Santa Clara, CA (US); Sherif Embabi, Plano, TX (US); Moderage C. Fernando, Plano, TX (US); Wing Kan Chan, Allen, TX (US); Charles Gore, Jr., McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 400 days.

(21) Appl. No.: 10/102,428

(22) Filed: Mar. 19, 2002

(65) Prior Publication Data

US 2002/0181614 A1 Dec. 5, 2002

Related U.S. Application Data

(60) Provisional application No. 60/282,582, filed on Apr. 9, 2001.

(51) Int. Cl.
*H04B 1/26* (2006.01)
*H04B 15/00* (2006.01)

(52) U.S. Cl. ............... 455/130; 455/313; 455/334; 375/240.21; 375/322; 375/350

(58) Field of Classification Search ............... 455/283, 455/323–326, 339, 313–316, 319, 334, 234.1; 375/316, 355, 346, 240.21, 334
See application file for complete search history.

(56) References Cited

U.S. PATENT DOCUMENTS 5,557,642 A * 9/1996 Williams ............... 375/316
5,640,698 A * 6/1997 Shen et al. ............... 455/323
6,002,925 A * 12/1999 Vu et al. ............... 455/313

(Continued)

FOREIGN PATENT DOCUMENTS

WO   WO 94/05089   3/1994

OTHER PUBLICATIONS

"An 81-MHz IF Receiver in CMOS", Armond Hairapetian, IEEE Journal of Solid-State Circuits, IEEE Inc., New York, US, vol. 31, No. 12, Dec. 1996, pp. 1981-1986, XP000691818, ISSN: 0018-9200.

"Simulation Strategies for RF Design", Electronic Engineering, Morgan-Gramplan Ltd., London, GB, vol. 68, No. 832, Apr. 1996, pp. 43-44, 46, 48, 5, XP000595533, ISSN:0013-4902.

(Continued)

*Primary Examiner*—Simon Nguyen
(74) *Attorney, Agent, or Firm*—Ronald O. Neerings; Wade J. Brady, III; Frederick J. Telecky, Jr.

(57) ABSTRACT

A subsampling receiver (50, 50', 50") for converting an RF signal to baseband is disclosed. The subsampling receiver (50, 50', 50") may be implemented into a wireless communications device (40), such as a wireless telephone handset. In one disclosed embodiment, the receiver (50) includes a sample and hold circuit (80) that samples a bandpass filtered input modulated signal at the subsampling frequency ($f_s$) that is well below the RF carrier frequency but twice the bandwidth (BW) of the payload; the sampled signal is digitized, and applied to two digital mixers (85I, 85Q) to produce in-phase and quadrature components (I,Q) of the payload. In another embodiment, the receiver (50') includes two sample and hold circuits (96I, 96Q) to sample the filtered signal at different phases of the sampling frequency, to produce the in-phase and quadrature digital components. In a third embodiment, the receiver (50") includes an analog mixer (116) to downconvert the RF input to an intermediate frequency, prior to digitization and digital mixing at quadrature phase.

27 Claims, 6 Drawing Sheets

U.S. PATENT DOCUMENTS 6,005,506 A * 12/1999 Bazarjani et al. ........... 341/143
6,104,764 A * 8/2000 Ohta et al. .................. 375/332
6,243,430 B1 * 6/2001 Mathe ........................ 375/346
6,346,898 B1 * 2/2002 Melanson ................... 341/143
6,674,822 B1 * 1/2004 Legrand et al. ............. 375/355
6,687,493 B1 * 2/2004 Sorrells et al. ............. 455/323

OTHER PUBLICATIONS

"The Digital Front-End of Software Radio Terminals", Hentschel, T., et al., IEEE Personal Communications, IEEE Communications Society, US, vol. 6, No. 4, Aug. 1999, pp. 40-46, XP000849382, ISSN: 1070-9916.

* cited by examiner

SUBSAMPLING RF RECEIVER ARCHITECTURE

CROSS-REFERENCE TO RELATED APPLICATIONS

This application claims priority, under 35 U.S.C. §119(e), of Provisional Application No. 60/282,582, filed Apr. 9, 2001.

STATEMENT REGARDING FEDERALLY SPONSORED RESEARCH OR DEVELOPMENT

Not applicable.

BACKGROUND OF THE INVENTION

This invention is in the field of wireless communications, and is more specifically directed to receiver circuitry used in such communications.

The popularity of mobile wireless communications has increased dramatically over recent years. It is expected that this technology will become even more popular in the foreseeable future, both in modern urban settings, and also in rural or developing regions that are not well served by line-based telephone systems. This increasing wireless traffic strains the available communications bandwidth for a given level of system infrastructure. As a result, there is substantial interest in increasing bandwidth utilization of wireless communications system to handle this growth in traffic.

This trend toward heavier usage of wireless technologies for communications, in combination with the advent of so-called third-generation, or "3G", wireless communications that also carry data, video, and other high data rate payloads, will require continuing improvements in the processing capabilities of the communications equipment. In particular, the higher required data rates will require corresponding increases in the digital processing of the communications payloads.

Modern digital communications technology utilizes multiple-access techniques to increase bandwidth utilization, and thus to carry more wireless traffic. Under current approaches, both time division multiple access (TDMA) and code division multiple access (CDMA) techniques are used in the art to enable the simultaneous operation of multiple communication sessions, or wireless "connections", each involving voice communications, data communications, or any type of digital payload. As evident from the name, TDMA communications are performed by the assignment of time slots to each of multiple communications, with each conversation transmitted alternately over short time periods. CDMA technology, on the other hand, permits multiple communication sessions to be transmitted simultaneously in both time and frequency, by modulating the signal with a specified code. On receipt, application of the code will recover the corresponding conversation, to the exclusion of the other simultaneously received conversations.

Wideband CDMA (WCDMA) is an extension of CDMA communications, and is contemplated to be useful for enhanced services such as contemplated in 3G wireless. WCDMA involves a higher chip rate than in conventional CDMA, and thereby supports higher bit rates, increases spectrum efficiency by way of better statistical averaging, and provides better coverage by improving frequency diversity.

In the receipt of wireless communications devices, digital receiver circuitry in general performs the function of converting the received high frequency signal to a "baseband" signal output. As known in the art, the term "baseband" refers to the signal at its original band of frequencies. The baseband signal is typically in its multiplexed form, for example corresponding to multiple communications that are carried out on multiple time or code channels, depending upon whether the communications are TDMA, CDMA, or WCDMA.

Modern wireless systems place stringent demands on the analog filtering and digital processing of received signals. These demands arise from the high frequencies involved in conventional wireless communications, such frequencies typically in the radio frequency (RF) bands, and also from the relatively low received signal power levels. As a result, relatively costly and complex techniques are commonplace in these systems.

For example, surface acoustic wave (SAW) filters are often used in conventional wireless receivers, for example in implementing band pass filters. As known in the art, conventional SAW filters include a piezoelectric substrate, on the surface of which input and output sets of interdigitated metal fingers are formed. The bandpass filtering is effected by the received signal being applied to the input set of interdigitated metal fingers, with surface acoustic waves excited by the piezoelectric substrate in response to the electric field generated between the electrodes. These acoustic waves propagate along the surface of the substrate and are received at the output set of interdigitated fingers, at which the piezoelectric substrate produces electrical signals in response to the surface acoustic waves. The wavelength of the output signals are determined by the lengths of the output fingers. Conventional SAW devices readily attain high frequency performance (with Q values up to on the order of 1000) while remaining relatively compact, in comparison with an equivalent electrical filter. However, because of the piezoelectric substrate, SAW filters are not integratable with conventional semiconductor integrated circuits. Accordingly, the use of SAW filters adds significantly to system cost.

Figure 1:
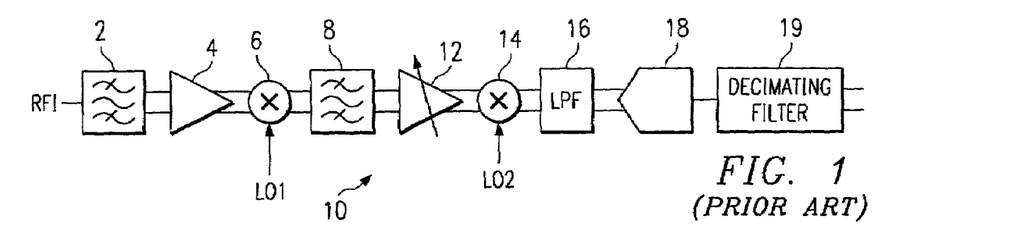
FIG. 1 is an electrical diagram, in block and schematic form, illustrating the architecture of a first conventional RF receiver.

Various conventional receiver architectures are now used in modern wireless systems, such as base stations and wireless handsets. These classes of architectures include heterodyne receivers, direct conversion receivers, and digital mixer architectures. FIG. 1 illustrates a first example of conventional heterodyne receiver 10. Receiver 10 includes SAW bandpass filter 2, which receives input RF signal RFI, and passes its filtered output to low noise amplifier (LNA) 4. The amplified signal is then downconverted by first mixer 6, which is typically an active mixer (gain>unity) that generates an output signal at an intermediate frequency that is the difference between the amplified RF input signal RFI and local oscillator signal LO1. This downconverted signal is then filtered by second SAW bandpass filter 8, and applied to automatic gain control (AGC) 12. The filtered downconverted signal at the intermediate frequency is then downconverted to baseband by I-Q mixers 14, which again are greater-than-unity gain analog mixers applying a periodic signal from a second local oscillator (not shown). The downconverted baseband signal is filtered by analog low-pass filter 16. Analog-to-digital converter (ADC) 18 samples and converts the baseband signal, at a sampling frequency that satisfies the Nyquist criterion of twice the bandwidth of the communicated signal. The digital signal is then decimated by decimating filter 19 to reduce the data rate, following which the signal is ready for demodulation and decoding.

However, this conventional heterodyne architecture is quite costly to implement, and also consumes a great deal of power, which is problematic for battery-powered devices such as wireless telephone handsets. A primary reason for this high power consumption and high cost derives from the use of SAW filters 2, 8, which necessarily consume significant power and must be realized off-chip, as described above. Because analog mixers 6, 8 operate at relatively low chopping frequencies, with greater than unity gain, high-Q filters such as SAW filters are required for reasonable fidelity. The multiple downconversions necessary to bring the input signal to baseband exacerbate these issues.

Figure 2:
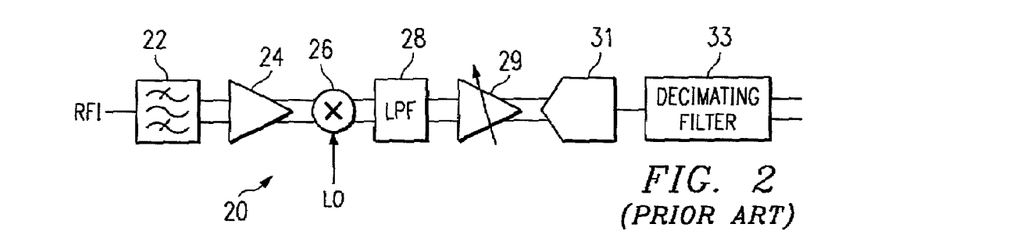
FIG. 2 is an electrical diagram, in block and schematic form, illustrating the architecture of a second conventional RF receiver.

Another type of conventional receiver reduces these noise issues by using only a single mixer to directly downconvert the RF signal to baseband. FIG. 2 illustrates an example of this type of architecture, in the form of conventional direct conversion receiver 20. In this example, SAW filter 22 receives input signal RFI, and applies the bandpass filtered signal to LNA 24. I-Q stage mixer 26 downconverts this filtered amplified input signal to baseband. Low pass filter 28 and AGC 29 clean up this downconverted signal, prior to digitization by ADC 31 and decimating by decimating filter 33, similarly as described above. While this architecture reduces the cost of manufacture relative to the heterodyne architecture of FIG. 1, the use of only one level mixer for downconversion causes this architecture to suffer from DC offset problems, significant even-order distortion, and flicker noise.

Figure 3:
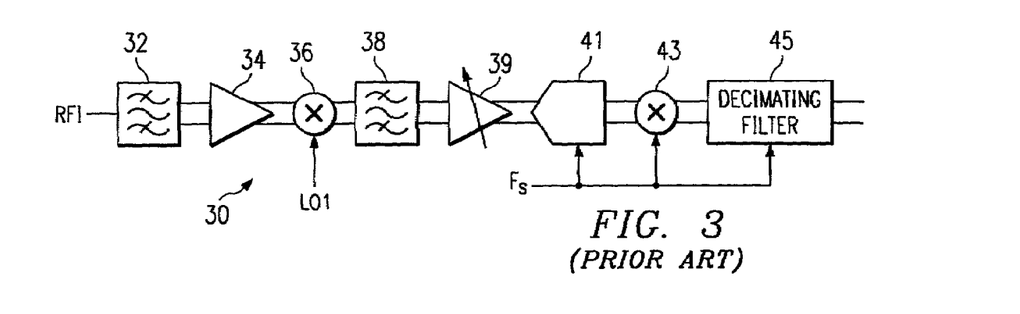
FIG. 3 is an electrical diagram, in block and schematic form, illustrating the architecture of a third conventional RF receiver.

FIG. 3 illustrates a conventional receiver architecture of the low-IF digital mixer type, which is effectively a compromise between the heterodyne and direct conversion receivers of FIGS. 1 and 2. As shown in FIG. 3, receiver 30 receives the RF input signal RFI with SAW bandpass filter 32, and applies the filtered output to LNA 34 as before. A single mixer 36 downconverts the filtered input signal to an intermediate frequency, which is again filtered by second SAW filter 38, and adjusted by AGC 39. ADC 41 converts the signal to digital, at a sampling frequency that is four times the intermediate frequency to which mixer 36 downconverted the input signal. I-Q mixer 45 then downconverts the digital signal, by applying a pattern of {−1, 0, +1, 0, 1, . . . }, at the sampling frequency, to the digital samples from ADC 43. This digital mixing by mixer 45 effectively applies a sinusoid of one-fourth of the sampling frequency to the digital output. Decimating filter 47 reduces the output data rate.

Digital mixer receiver 30 of FIG. 3 is a compromise of the heterodyne and direct conversion receivers, in that it still uses two stage mixers, but only one mixer is an analog mixer. The second, digital, mixer is not as sensitive to noise and distortion as an analog mixer, and thus receiver 30 is contemplated to provide good performance. In addition, the I & Q signals are generated in the digital domain, thus the matching between the I & Q branches is optimized. However, two SAW filters are still required in digital mixer receiver 30, maintaining relatively high cost for this approach.

BRIEF SUMMARY OF THE INVENTION

It is therefore an object of this invention to provide a radio frequency (RF) receiver that provides high performance at a reduced manufacturing cost and power dissipation.

It is a further object of this invention to provide such a receiver in which off-chip surface acoustic wave (SAW) filters are minimized.

It is a further object of this invention to provide such a receiver in which analog mixers need not be used or reduced in complexity.

It is a further object of this invention to provide such a receiver in which power consumption is also minimized.

It is a further object of this invention to provide such a receiver in which the matching between the I & Q branches is optimized.

Other objects and advantages of the present invention will be apparent to those of ordinary skill in the art having reference to the following specification together with its drawings.

The present invention may be implemented into a radio frequency (RF) receiver in which the received signal is sampled at a frequency that is significantly lower than its carrier frequency, but at least twice the bandwidth of the modulating signal. This subsampling results in aliasing of the signal, including a near-baseband alias of the communicated signal. Analog-to-digital conversion of the sampled baseband alias, and digital mixing can then be readily applied, producing a digital baseband signal for demodulation.

DETAILED DESCRIPTION OF THE INVENTION

This invention will now be described in connection with its preferred embodiment. More specifically, this invention is contemplated to be especially beneficial when used in a wireless telephone. Therefore, the preferred embodiment of this invention will be described in connection with an exemplary architecture for a wireless telephone. However, it is contemplated that this invention may be used in connection with wireless telephones of other architectures, and with devices and systems other than wireless telephones. It is therefore to be understood that those alternative implementations, and other alternative applications of this invention that will become apparent to those skilled in the art having reference to this specification, are within the true scope of this invention as claimed.

Figure 4:
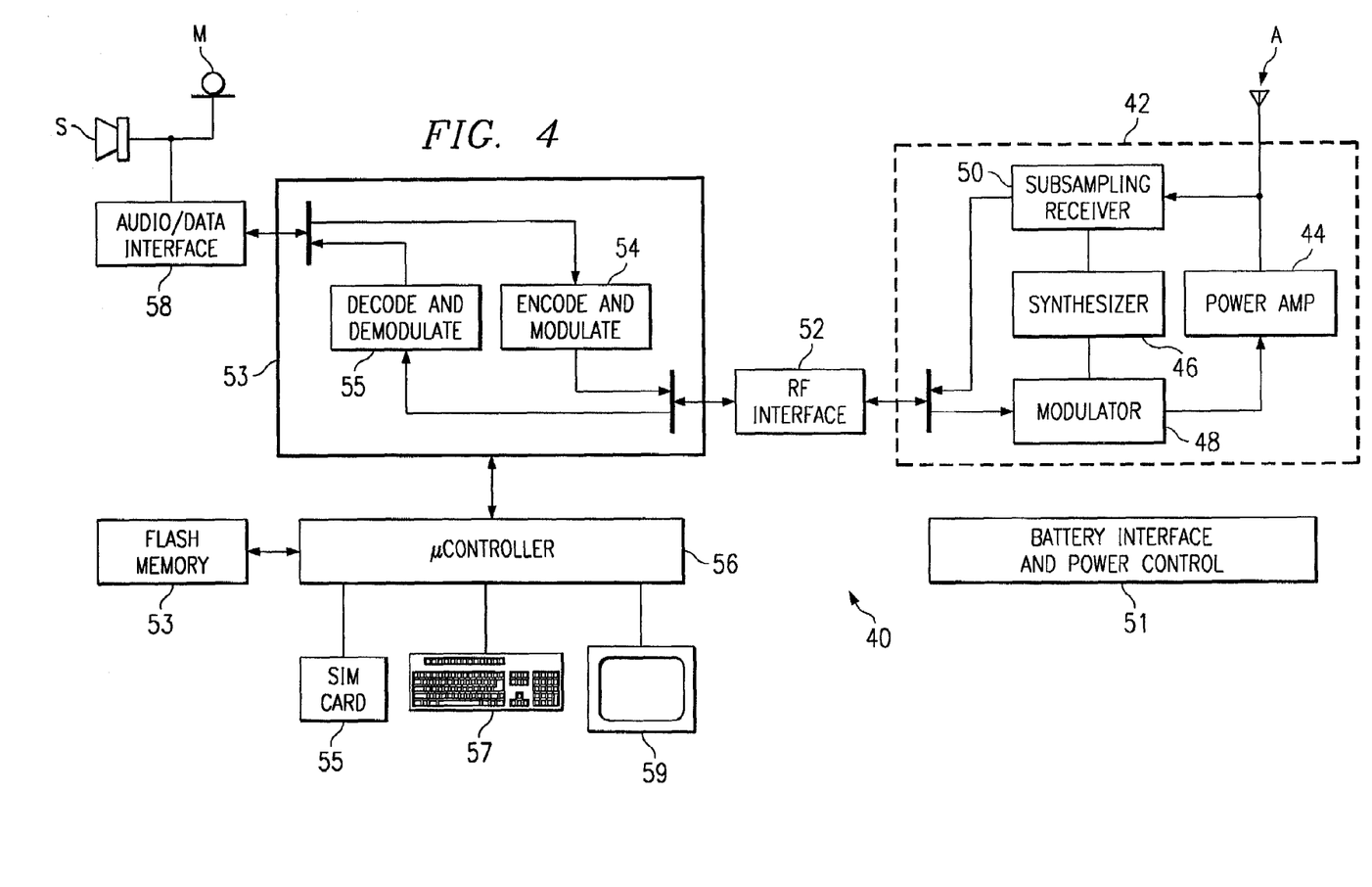
FIG. 4 is an electrical diagram, in block form, of a wireless communications device constructed according to the first preferred embodiment of the invention.

Referring now to FIG. 4, wireless unit 40 constructed according to the preferred embodiment of the invention will now be described in detail. Wireless unit 40 of FIG. 4 corresponds to a wireless handset, having at least the so-called "second generation", or "2G" capability, such as is typically used to carry out TDMA and CDMA broadband communication; it is further contemplated that wireless unit 40 may also be constructed to provide the so-called "third generation" or "3G" communications, which include data and video services. Of course, it is contemplated that the present invention may also be implemented in wireless base stations and other digital radio applications, for similar benefits from this invention. The architecture of the construction of wireless handset 40 shown in FIG. 4 is provided by way of example only, it being understood that such other alternative architectures may also be used in connection with the present invention.

The bulk of the digital signal processing performed on both signals to be transmitted and those received, is executed by digital signal processor (DSP) 53. In this architecture of wireless handset 40, DSP 53 is coupled on one side to audio interface 58, which in turn couples wireless unit 40 to speaker S and microphone M; on the other side, DSP 53 is coupled through RF interface circuitry 52 to radio subsystem 42 and antenna A. DSP 53 preferably has a significant amount of processing capacity to handle the digital processing necessary for both the transmit and receive operations. An example of a suitable digital signal processor for use as DSP 53 is the TMS320c6x family of digital signal processors available from Texas Instruments Incorporated, a preferred example of which is the TMS320C6416 DSP. The particular digital functions performed by DSP 53 will depend, of course, upon the communications protocol used by wireless unit 40.

On the transmit side, incoming voice communications from microphone M are forwarded to DSP 53 by audio interface 58. Within DSP 53, encode and modulate function 54 performs the appropriate digital processing functions for the particular protocol. For example, encode and modulate function 54 may first encode the received digital data into symbols, for example by way of a DFT operation. These symbols are then spread, by way of a spreading code, into a sequence of chips according to a selected chip rate; the spreading may also include the spreading of the symbols into multiple subchannels. According to the preferred embodiment of the invention, which will be described in further detail below, a cell-specific scrambling code is then applied to the spread symbols, and the scrambled spread symbols are modulated. In general, this modulation splits the subchannels into in-phase (I) and quadrature (Q) groups, so that the eventual modulated signal includes both components. Typically, RF interface circuitry 52 performs the appropriate filtering and phase modulation appropriate for the particular transmission protocol, on digital signals from DSP 53. For example, multiple channels of encoded digital bitstreams, corresponding to the combination of both in-phase (I) and quadrature (Q) components, may be forwarded to RF interface circuitry 52 by DSP 53. RF interface circuitry 52 converts these digital data into analog signals, phase-shifts the selected converted bitstreams to provide both in-phase (I) and quadrature (Q) analog signal components, and applies analog filtering as appropriate to the signals to be handed off to modulator 48 in radio subsystem 42. The spread spectrum sequence is converted into an analog signal by RF interface 32, with the desired filtering and pre-equalization to compensate for channel distortion, and is then transmitted over antenna A by radio subsystem 42. Modulator 48 in radio subsystem 42 receives these signals to be transmitted from RF interface circuitry 52, and generates a broadband modulated analog signal, under the control of synthesizer 46. Power amplifier 44 amplifies the output of modulator 48 for transmission via antenna A.

According to the preferred embodiments of the invention, on the receive side, incoming signals from antenna A are received by subsampling receiver 50 within radio subsystem 42 and forwarded to DSP 53 for digital processing via RF interface circuitry 52. In this embodiment of the invention, as will be described in detail below, subsampling receiver 50 in radio subsystem 42 converts the received analog signal into the appropriate digital format for processing by DSP 53. In this example, as will become apparent from the following description, in-phase (I) and quadrature (Q) components of the received signal are separated and filtered by subsampling receiver 50, including the necessary analog to digital conversion so that digital bitstreams corresponding to the separated and filtered components of the received signal are forwarded to DSP 53 by RF interface circuitry 52.

On the receive side, DSP 53 will digitally perform such functions as channel decoding of the data from subsampling receiver 50 to retrieve a data signal from the received digitally spread signal, followed by the decoding of the speech symbols from the channel decoded data using techniques such as inverse discrete Fourier transforms (IDFT) and the like, as illustrated in FIG. 4 by decode and demodulate circuitry 55. Equalization, error correction, and decryption processes are also performed upon the received signal as appropriate. The resulting signal processed by DSP 53 on the receive side is then forwarded to audio interface 58, for output via speaker S.

Other support circuitry is also provided within wireless handset 40 as shown in FIG. 4. In this example, controller 56 handles the control of wireless handset 40 other than the data path. Such control functions include resource management, operating system control, and control of the human interface; in this regard, controller 56 operates with such functions as memory 33 (for storage of the operating system and user preferences), keypad 57, and user display 58.

Figure 5A:
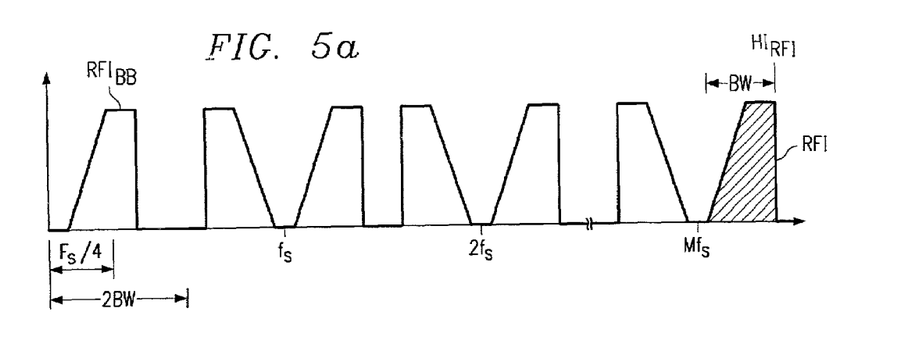
FIGS. 5*a* and 5*b* are frequency plots illustrating the spectra resulting from subsampling, including the effects of noise in conventional subsampling.

Referring now to the frequency spectrum of FIG. 5a, the theory of operation of subsampling receiver 50 according to the preferred embodiments of the invention will now be described. FIG. 5a illustrates signal RFI received by subsampling receiver 50. As shown in FIG. 5a, signal RFI is a relatively high frequency signal, and has a bandwidth BW that extends to the highest frequency $HI_{RFI}$ within signal RFI. In conventional wireless communications, the payload of signal RFI is a relatively low frequency modulation of a high frequency carrier or set of subcarriers. It is the carrier frequencies that position the spectrum of transmitted signal RFI at this high frequency, with the payload of transmitted signal RFI contained within bandwidth BW.

According to the well-known Nyquist criterion, an analog signal must be sampled at a sampling frequency that is twice the bandwidth of the signal of interest in order to faithfully reproduce the signal, without the presence of so-called destructive "aliases". If one were to attempt to satisfy the Nyquist criterion relative to signal RFI, one would sample at twice the highest frequency $HI_{RFI}$. Considering that the frequencies of conventional wireless telephony are well into the GHz range, such sampling requires extremely high performance integrated circuits.

According to the present invention, however, subsampling receiver 50 samples the received signal RFI at a frequency $f_s$ that is much lower than the theoretical Nyquist frequency $2HI_{RFI}$. As a result of this subsampling, many aliases are generated, as shown in the frequency spectrum of FIG. 5a. These aliases include mirror images of signal RFI about each multiple of sampling frequency $f_s$, because of the "folding" effect of the subsampling. Of particular interest, however, is the lowest frequency alias $RFI_{BB}$. This alias corresponds to the actual signal RFI, but is near-baseband in absolute frequency. According to this invention, this low frequency alias is retrieved by subsampling receiver 50, in effect downconverting signal RFI to a near-baseband version $RFI_{BB}$.

Figure 5B:
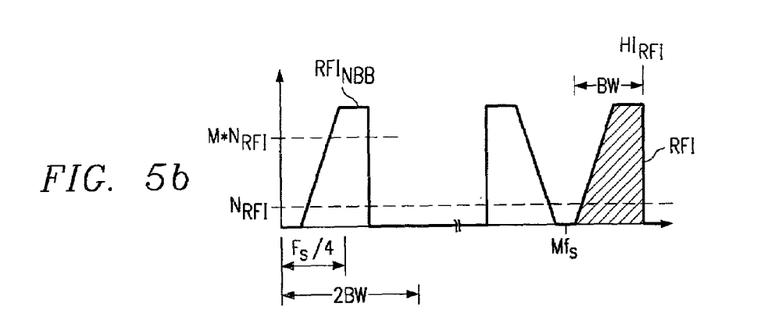

The generation of aliases as shown in FIG. 5a, as noted above, results from the "folding" of the sampled signal about the multiples of the sampling frequency $f_s$. Because the sampling frequency $f_s$ is at least twice the bandwidth BW of signal RFI, the spectra of the aliases do not overlap onto one another. However, any broadband noise will be folded and summed together at each alias frequency across the spectrum. FIG. 5b illustrates, for example, the presence of broadband noise $N_{RFI}$ across all frequencies. The power of broadband noise $N_{RFI}$ is low enough to not significantly affect signal RFI. However, because this noise $N_{RFI}$ is additively folded M times with each alias resulting from the subsampling, the noise level becomes $M*N_{RFI}$ at the low frequencies of near-baseband alias $RFI_{NBB}$, as shown in FIG. 5b. This additive noise level $M*N_{RFI}$ may approach or exceed the power of near-baseband alias $RFI_{NBB}$, rendering this alias useless as a downconversion of the signal RFI. According to the present invention, however, the effects of this accumulated noise is avoided in subsampling receiver 50.

Figure 5C:
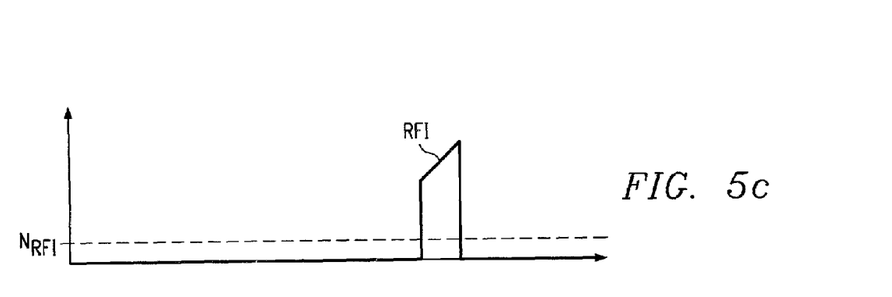
FIGS. 5*c* through 5*f* are frequency plots illustrating the operation of the subsampling receiver according to a first preferred embodiment of the invention.
Figure 6:
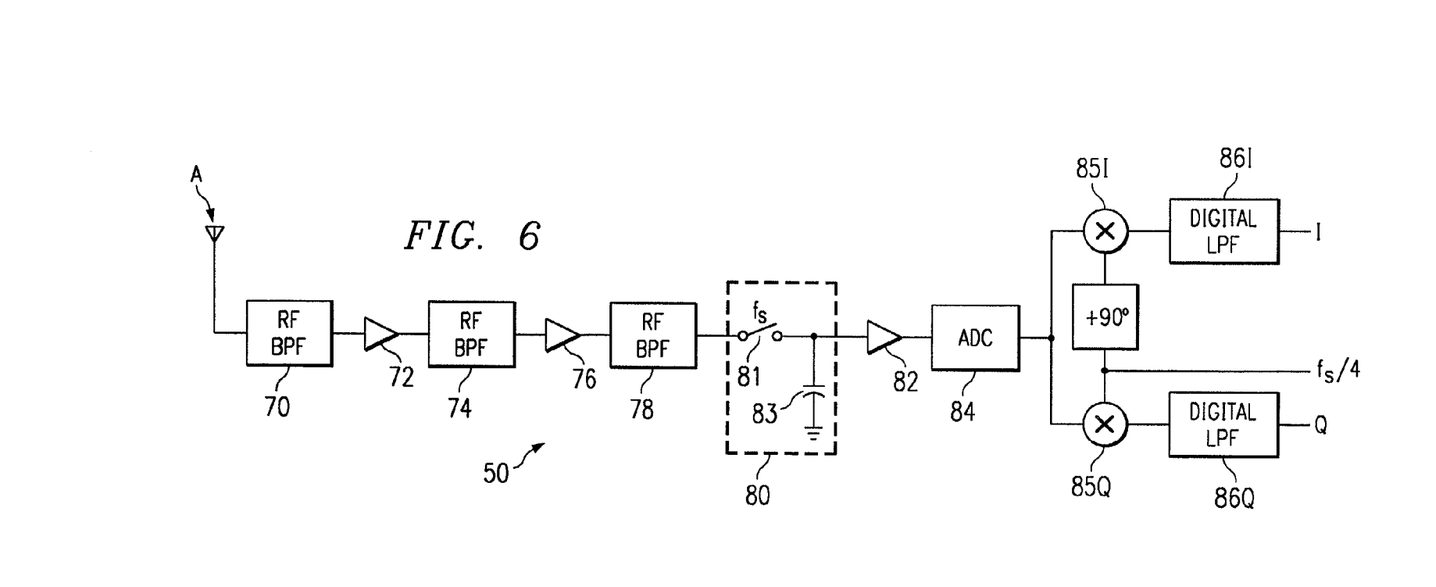
FIG. 6 is an electrical diagram, in block and schematic form, of a subsampling receiver constructed according to a first preferred embodiment of the invention.

Referring now to FIG. 6, the construction and operation of subsampling receiver 50 according to a first embodiment of this invention will now be described in detail. As will be apparent from the following description, subsampling receiver 50 is constructed so as to be efficiently buildable into a single integrated circuit, along with other analog functions contained within wireless handset 30, if desired. As shown in FIG. 6, the signal from antenna A is received by subsampling receiver 50. FIG. 5c illustrates the frequency spectrum of this signal, including both the RF input signal RFI, which is centered at a high, RF, frequency, and also broadband noise $N_{RFI}$. This signal is applied to first RF bandpass filter 70, which filters the received signal to the frequency range around its carrier frequencies. According to this embodiment of the invention, after bandpass filter 70, the filtered signal is applied to low-noise amplifier (LNA) 72, which amplifies the signal by on the order of 20 dB with a noise figure of 2 dB or less; the amplified signal is again filtered by bandpass filter 74, about the same frequency band as bandpass filter 70. However, bandpass filter 74 need not have the ultra-high Q value provided by a SAW filter, as conventionally used as discussed above. Rather, an integrated on-chip filter may be used to realize bandpass filter 74. The preferred realization of bandpass filter 74 is a conventional LC filter, in which the capacitor is embodied in the integrated circuit on-chip with subsampling receiver 50, and in which the parasitic induction of the integrated circuit bond wires serves as the inductor element of filter 74.

Figure 5D:
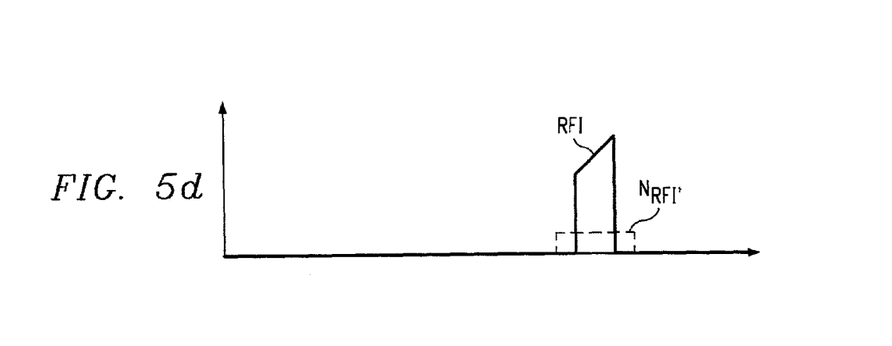

Second LNA 76 amplifies the signal again, for example with a gain of on the order of 22 dB with a noise figure of 4 dB or less, followed by another instance of RF bandpass filtering by filter 78. Filters 70, 74, 78 not only remove the broadband noise described above relative to FIG. 5b, but also remove any noise added or amplified by LNAs 72, 76. As a result of the operation of filters 70, 74, 78, and LNAs 72, 76, an amplified band-limited RF signal is produced. FIG. 5d illustrates the frequency spectrum of this signal, illustrating that the broadband noise originally received (FIG. 5c) is also band-limited ($N_{RFI}'$). The amplified band-limited RF signal presented by filter 78 is then sampled by sample-and-hold circuit 80 realized by switch 81 and capacitor 83. Switch 81 samples the output of bandpass filter 78 by closing at sampling frequency $f_s$. As described above, the Nyquist criterion requires that this sampling frequency $f_s$ be at least twice the information bandwidth BW in the input signal RFI. According to this first embodiment of the invention, as will be described in further detail below, simple digital mixers (85) are used to generate the output baseband signal. This further constrains the sampling frequency $f_s$ to:

$$f_S = \frac{RF}{M + 0.25}$$

where RF is the nominal carrier frequency of input signal RFI, and where M is an integer, and which will correspond to the multiple of the sampling frequency $f_s$ nearest the frequency of input signal RFI. For example, for an input signal frequency of 1575 MHz, as is typical in wireless communications, an integer M value of 19 and a sampling frequency $f_s$ of 81.84 MHz are suitable values. This sampling frequency well exceeds the requirement of twice the bandwidth (e.g., on the order of 2 MHz) For these frequencies, it is contemplated that capacitor 83 may have a size that is on the order of 4 pF, assuming that the resistance of switch 81 is on the order of 25 Ω. These component values are reasonable for integrated circuit implementation.

Figure 5E:
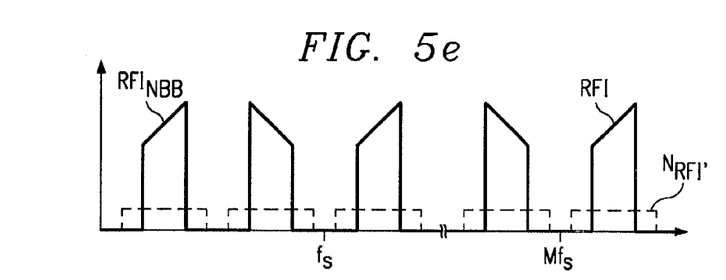

The effect of sample and hold circuit 80 is to provide a signal that includes the original RF signal and also a near baseband alias to the input of amplifier 82. Referring back to FIGS. 5a and 5b, the signal applied to amplifier 82 by sample and hold circuit 80 includes the near baseband alias $RFI_{NBB}$, as shown in FIG. 5e. However, because of bandpass filters 70, 74, 78, the noise level $N_{RFI}$ is not additively present within this near baseband frequency range, because these bandpass filters eliminate noise from frequencies outside of the passband, so that the signal-to-noise ratio of the near-baseband alias $RFI_{NBB}$ does not degrade due to the sampling process, as shown in FIG. 5e.

The sampled analog values are applied to the input of amplifier 82. According to this preferred embodiment of the invention, amplifier 82 is realized as a switched capacitor amplifier, to reduce the dynamic range over which digitization is to be performed (for example to a range of on the order of 40 dB). However, amplifier 82 need not operate at RF, because of the down-converting performed by sample and hold circuit 80. In addition, amplifier 82 need not be particularly large, given the relatively low frequencies of the near-baseband alias. The noise figure of amplifier 82 ought to be lower than 20 dB, however, so that the signal-to-noise ratio of the received transmission is not degraded; the gain of amplifier 82 is preferably about 45 dB.

Analog-to-digital converter (ADC) 84 receives the amplified output form amplifier 82, which corresponds to a sequence of analog samples of the near-baseband alias of the input signal RFI. ADC 84 also can be relatively simple, such as a seven-bit ADC, considering that its operation is confined to the near-baseband frequencies and that the dynamic range at its input is only about on the order of 40 dB. The output of ADC 84 is a sequence of digital words, corresponding to the sampled analog signal.

Figure 5F:
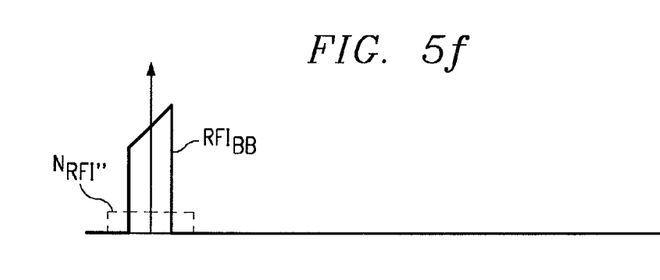

Digital mixers 85 then perform the final downconversion of the digital signal from near-baseband to baseband. According to this embodiment of the invention, in-phase I and quadrature Q components are produced, which together correspond to the in-phase and quadrature components of the quadrature amplitude modulation (QAM) input signal. Quadrature digital mixer 85Q downconverts the near-baseband signal to baseband by multiplying the digital values with a sequence of values {−1, 0, +1, 0, −1, . . . } applied at a frequency that is one-fourth the sampling frequency $f_s$ at which sample and hold circuit 80 closes switch 81. Similarly, in-phase digital mixer 85I downconverts the same near-baseband digital signal to baseband by applying a sequence of values {0, +1, 0, −1, . . . }, also at one-fourth the sampling frequency $f_s$, but phase-shifted by 90° from the sequence used by quadrature digital mixer 85Q. The outputs of digital mixers 85I, 85Q are low-pass filtered by digital filters 86I, 86Q, respectively, to produce the baseband in-phase and quadrature components I, Q, respectively. The effective frequency spectrum of the output of digital mixers 85I, 85Q, after filtering by respective digital filters 86I, 86Q, is illustrated in FIG. 5f, as baseband signal $RFI_{BB}$. Again, the noise $NRF_{RFI}''$ is not cumulative, but instead is within a reasonable signal-to-noise ratio.

Another concern in connection with this embodiment of the invention is in connection with the jitter on the sampling frequency $f_s$ clock. As known in the art, the maximum tolerable jitter is inversely proportional to the RF center frequency of the input signal RFI. It has been discovered, however, that the jitter requirement is somewhat less constrained according to this embodiment of the invention, for example relative to a stand-along analog-to-digital conversion, primarily because the jitter noise level is proportional to the signal level, permitting a constant signal-to-jitter-noise ratio that can be incorporated into the design. This constant ratio effectively reduces the dynamic range for the jitter time calculation, relaxing the jitter constraint. More specifically, one can use the relationship of jitter time $t_j$:

$$t_j = \frac{10^{\left(\frac{SNR_j - 10\log OSR}{20}\right)}}{2\sqrt{2}\,\pi f_{in}}$$

where $SNR_j$ is the dynamic range of the jitter, where OSR is the ratio of the sampling frequency $f_s$ to bandwidth BW, and where $f_{in}$ is the maximum input frequency to sample and hold circuit 80. For example, an $SNR_j$ of 45 dB, at a sampling frequency $f_s$ of 81.82 MHz, bandwidth of 2 MHz, and an input frequency $f_{in}$ of 1575 MHz, yields a jitter time $t_j$ of 2.5 psec, which is readily attainable from conventional clock circuits.

According to this first preferred embodiment of the invention, therefore, an RF receiver suitable for use as a CDMA or WCDMA receiver is provided, in which the filters and amplifiers may be realized by way of conventional integrated circuits. Specifically, high-Q RF filters such as SAW filters are not required, and DC offset is avoided. Furthermore, analog mixers are not necessary in this receiver, which further simplifies the design, as well as the chip area and manufacturing cost, along with reduced power consumption. In addition, the critical components of the analog-to-digital converter, and also some amplifiers, need not be designed for RF performance, but rather can be optimized for relatively low frequencies, such as the near base-band. In addition, the ease of producing a sub-sampling receiver, in which the sample-and-hold function can operate at relatively low frequencies, is attained without the usual problem of additive folded broadband noise that conventionally accumulates in subsampling applications.

Figure 7:
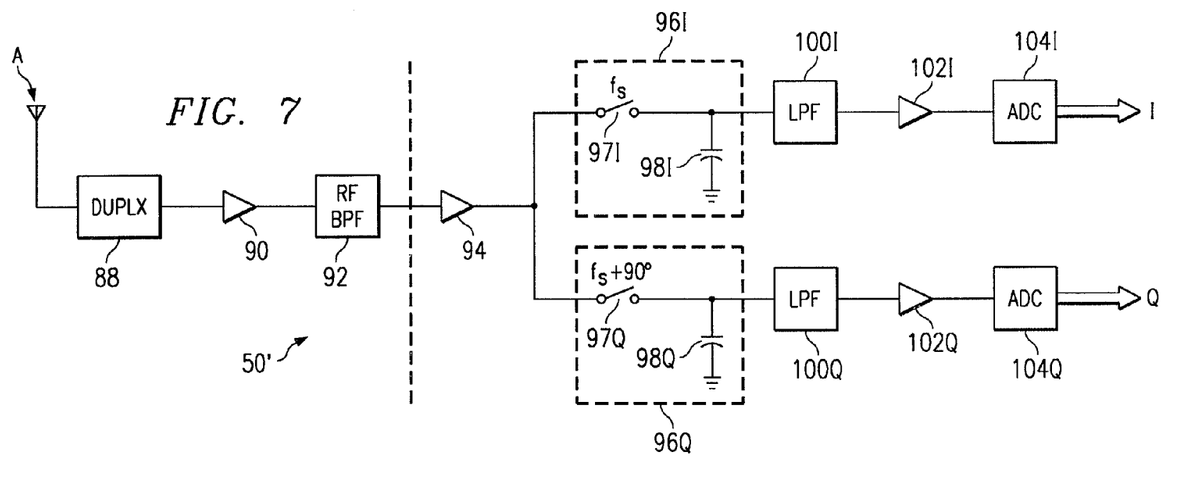
FIG. 7 is an electrical diagram, in block and schematic form, of a subsampling receiver constructed according to a second preferred embodiment of the invention.

Referring now to FIG. 7, the construction and operation of subsampling receiver 50' according to a second preferred embodiment of the invention will now be described in detail. According to this second embodiment of the invention, each of the in-phase and quadrature components I, Q have their own sample-and-hold circuits, and as such avoids the necessity for digital mixers. In addition, as will become apparent from this description, subsampling receiver 50' is particularly well-suited for use in a multi-mode WCDMA receiver.

Antenna A is connected to duplexer 88, as shown in FIG. 7; as known in the art, duplexer 88 is a conventional circuit that combines both the transmit and receive signals over antenna A. Duplexer 88 attenuates the received signal from antenna A by on the order of 3 dB, as is typical. In this embodiment of the invention, signals received from antenna A via duplexer 88 are amplified by LNA 90, having a gain of on the order of 20 dB and a noise figure of 2 dB, and are filtered by RF bandpass filter 92. The filtered amplified signals are then applied to an input of LNA 94. As suggested by the dashed line in FIG. 7 corresponding to a chip boundary, it is contemplated that duplexer 88, LNA 90, and RF bandpass filter 92 may be realized off-chip, relative to LNA 94 and the remainder of the functions of subsampling receiver 50', which are preferably implemented on a single integrated circuit.

LNA 94 is a second low-noise amplifier, applying a gain of on the order of 22 dB and having a noise figure of 4 dB. At this point, noise on the received signal is band-limited to frequencies in the RF range of the payload bandwidth, for example as illustrated in FIG. 5d discussed above. According to this embodiment of the invention, the output of LNA 94 is separately sampled by sample and hold circuits 96I, 96Q to produce each of the in-phase and quadrature component outputs I, Q, respectively. Each of sample and hold circuits 96I, 96Q include a respective switch 97I, 97Q and capacitor 98I, 98Q, for effecting the sample and hold operations. Switch 97I in sample and hold circuit 96I is closed at sampling frequency $f_s$, while switch 97Q in sample and hold circuit 96Q is also closed at sampling frequency $f_s$ but at a 90° phase shift relative to switch 97I in sample and hold circuit 96I. As in the previously described example, sampling frequency $f_s$ is much lower than the RF center frequency, but is at least twice the bandwidth BW of the incoming signal, to satisfy the Nyquist criterion relative to the modulating signal of interest. According to this embodiment of the invention, sampling frequency $f_s$ is selected so that the center frequency of the input RF signal is an integer multiple of sampling frequency $f_s$. For example, a preferred sampling frequency $f_s$ of 40.37 MHz is a good choice for an RF center frequency of 2140 MHz. The analog values sampled by each of sample and hold circuits 96I, 96Q have spectra including not only the RF signal and its band-limited noise, but also aliases of the signal and noise at each integer multiple of sampling frequency $f_s$, as shown in FIG. 5e discussed above.

Each of the in-phase and quadrature legs of subsampling receiver 50' process their sampled signals to produce the respective baseband in-phase and quadrature output signal components I, Q. Referring to the in-phase leg, sample and hold circuit 96I is coupled to low pass filter 100I, which is preferably an analog low-pass filter having a cutoff frequency sufficient to isolate the baseband alias (FIG. 5f). The filtered analog signal is then applied to switched-capacitor amplifier 102I, having a gain of about 54 dB and a noise figure of about 20 dB, which amplifies the analog signal to present a usable dynamic range of on the order of 40 dB to analog-to-digital converter (ADC) 104I. ADC 104I, which may be on the order of a seven-bit ADC, converts the filtered analog baseband alias to a stream of digital words corresponding to the in-phase component I of the modulated received signal. Similarly, in the quadrature leg, analog low pass filter 100Q filters the aliased sampled analog signal to baseband; this filtered signal is amplified by switched-capacitor amplifier 102Q, and digitized by ADC 104Q to produce quadrature component Q of the modulating incoming signal.

In-phase and quadrature components I, Q are therefore related to one another by a relative phase shift of 90° relative to one another, considering the phase difference in the switching of their respective sample-and-hold circuits 96I, 96Q. These components thus correspond to the quadrature phase signals in the modulating QAM signal, and thus correspond to the payload of the communication. The effect of LNAs 90, 94 raise the power level of the incoming RF signal sufficiently to overcome the thermal noise of sample and hold circuits 96I, 96Q. In addition, no filter is included between LNA 94 and sample and hold circuits 96, because it is contemplated that the broadband noise added by LNA 94 will be much less than the total input noise prior to sample and hold circuits 96, and thus is not a significant problem in this embodiment of the invention.

As evident from this description, sample and hold circuits 96 must be operable so as to not attenuate signals at up to the maximum RF bandwidth, while sampling at the relatively low sampling frequency $f_s$. At RF frequencies of up to on the order of 2140 MHz for WCDMA communications having bandwidths of 4 MHz, an example of sample and hold circuits 96 would include capacitor 98 of about 3.5 pF and switch 97 with an on resistance of about 20 Ω; this construction would result in sample and hold noise power of about −70 dBm, which is suitable at these frequencies.

Similarly as discussed above relative to the first preferred embodiment of the invention, the clock jitter $t_j$ of sample and hold circuits 96 is also of concern. As before, the jitter requirement for subsampling receiver 50' corresponds to:

$$t_j = \frac{10^{\left(\frac{SNR_j - 10\log OSR}{20}\right)}}{2\sqrt{2}\,\pi f_{in}}$$

where $SNR_j$ is the dynamic range of the jitter, where OSR is the ratio of the sampling frequency $f_s$ to bandwidth BW, and where $f_{in}$ is the maximum input frequency to sample and hold circuit 80. For example, an $SNR_j$ of 35 dB, at a sampling frequency $f_s$ of 40.37 MHz, bandwidth of 4 MHz, and an input frequency $f_{in}$ of 2140 MHz, yields a jitter time $t_j$ of 3 psec, which is readily attainable from conventional clock circuits.

According to this second preferred embodiment of the invention, numerous advantages are enabled in the receiving of RF signals, such as used in WCDMA communications. In addition to the benefits of not requiring the use of SAW filters or analog mixers, and avoiding DC offset, this second embodiment of the invention also does not require the use of digital mixers. This further simplifies the design of the subsampling receiver, reduces the power consumption of the circuit, and also reduces the chip area required for the receiver and thus reducing its manufacturing cost. These benefits are attained without the usual problem of additive folded broadband noise that conventionally accumulates in subsampling applications.

According to a third preferred embodiment of the invention, subsampling receiver 50" illustrated in FIG. 8 will now be described in detail. This particular architecture uses a SAW filter at RF frequencies, as will become apparent, but still achieves notable performance and cost advantages over conventional WCDMA receivers.

Figure 8:
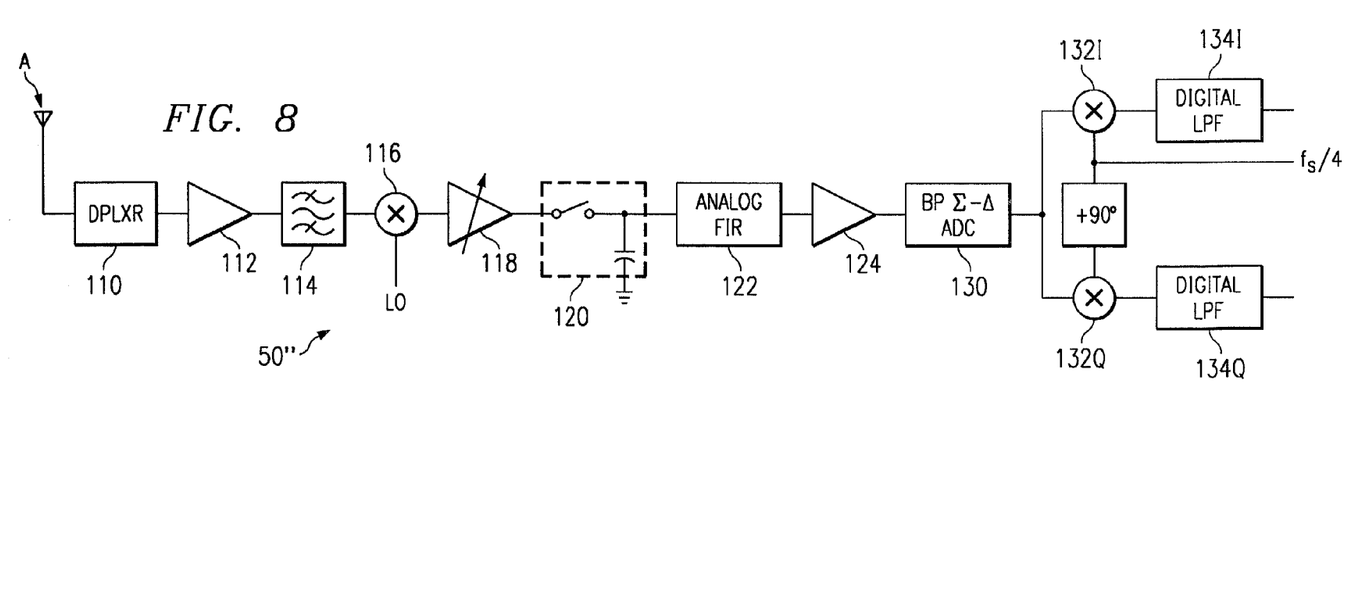
FIG. 8 is an electrical diagram, in block and schematic form, of a subsampling receiver constructed according to a third preferred embodiment of the invention.
Figure 9A:
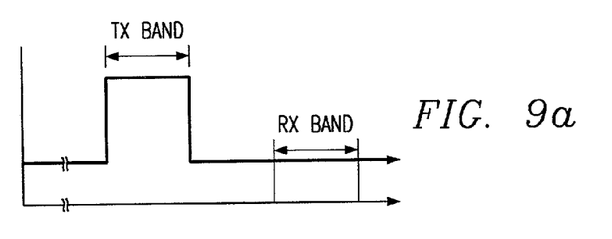
FIGS. 9*a* through 9*c* are frequency spectra illustrating the operation of the subsampling receiver of a third preferred embodiment of the invention.
Figure 9B:
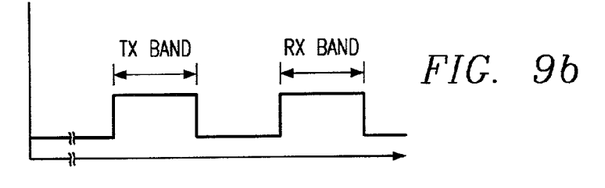

As illustrated in FIG. 8, signals received at antenna A are received at duplexer 110. As conventional in the art, duplexer 110 combines both signals to be transmitted and signals received at antenna A. As such, the frequency spectrum of signals received by duplexer 110 include both relatively strong signals in the transmit band as well as signals in the receive band, and noise over all frequencies. Duplexer 110 serves to eliminate much of the unwanted spectrum from the signals at antenna A. FIG. 9a illustrates the frequency spectrum of signals at antenna A, while FIG. 9b illustrates the spectrum at the output of duplexer 110 as coupled to the input of first low noise amplifier (LNA) 112. As evident from a comparison of these spectra, duplexer 110 performs significant filtering of these signals, while retaining significant power in both of the RF transmit and receive bands.

Figure 9C:
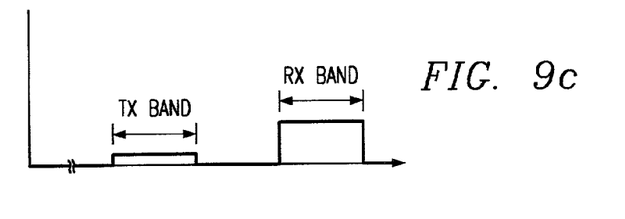

LNA 112 is a low noise amplifier, providing low noise amplification of the signal from duplexer 110. This amplified signal is applied to SAW filter 114, which effects a band pass filtering of the amplified signal, effectively removing much of the power from the transmit band while retaining the received signal in the received RF band, as shown in FIG. 9c. This bandpass filtered signal is applied to one input of analog RF mixer 116, which downconverts the bandpass RF signal from its RF frequency (e.g., on the order of 2140 MHz for WCDMA) to an intermediate frequency, for example on the order of 90 MHz, based upon the mixing of the filtered received signal with a local oscillator signal LO, in the conventional manner. It is contemplated that the output of mixer 116 will be over a relatively wide frequency range, a portion of which will contain the bandwidth of the RF received signal of interest. The output of mixer 116 is then applied to automatic gain control circuit (AGC) 118, to equalize the amplitude over the various frequencies. Sample and hold circuit 120 then receives the amplified signal, and samples this analog signal at a sampling frequency $f_s$, in the manner described above. The determination of this sampling frequency $f_s$ will now be described in detail, based on the bandwidth of the signal and the bandwidth of the received RX band, and also the selection of the intermediate frequency.

For example, consider a signal bandwidth $BW_S$ of 5 MHz and a receive bandwidth $BW_R$ of 60 MHz, within which the signal bandwidth $BW_S$ can reside. At one extreme, if the signal bandwidth $BW_S$ resides in the upper end of the 60 MHz receive bandwidth $BW_R$, the channel can be moved in frequency to as low as 30 MHz before frequencies from the lower frequency end of the receive bandwidth $BW_R$ wrap around 0 Hz and distort the signal at the upper end of the receive bandwidth $BW_S$. This sets the minimum center frequency for the signal bandwidth $BW_S$ at 30 MHz. At the other extreme, the signal bandwidth $BW_S$ may alternatively reside in the lower 5 MHz of the receive bandwidth $BW_R$. Centering the signal bandwidth $BW_S$ at 30 MHz, as required from the first extreme case, the non-signal portion of the receive bandwidth $BW_R$ (which is 55 MHz) will extend from 32.5 MHz to 87.5 MHz. In order for sampling to occur without destructive aliasing into the signal bandwidth $BW_S$ centered at 30 MHz, the minimum sampling frequency $f_s$ must therefore be 120 MHz, because this sampling rate will fold the frequencies from 60 MHz to 87.5 MHz into the frequencies from 32.5 MHz to 60 MHz, which does not disturb the signal bandwidth $BW_S$ that extends over the 5 MHz from 27.5 MHz to 32.5 MHz. Finally, assuming a sampling frequency $f_s$ of 120 MHz, the intermediate frequencies of 90 MHz and 120 MHz become available to downconvert the 5 MHz signal bandwidth $BW_S$ to 30 MHz (i.e., the difference between the sampling and intermediate frequencies). Between these two frequencies, 90 MHz is the preferred intermediate frequency, to reduce the jitter requirements (as will be noted below).

It is contemplated that those skilled in the art having reference to this specification will be readily able to adopt similar analysis for selecting the sampling and intermediate frequencies used according to this third preferred embodiment, for implementations using other signal and receive bandwidths.

At these frequencies, it is of course important that sample and hold circuit 120 must be operable up to the intermediate frequency bandwidth. Assuming an on-resistance of 50 Ω for the switch, a capacitance of 8 pF will be suitable in this application. It is contemplated that the sample and hold thermal noise will be on the order of −81 dBm, for a WCDMA bandwidth of 4 MHz and a sampling frequency $f_s$ of 120 MHz.

In this example, as described above, the output of sample-and-hold circuit 120 thus presents the received input channel of interest at frequencies centered at 30 MHz. Because the sampling frequency $f_s$ (120 MHz) is not twice the intermediate frequency (90 MHz) in this example, aliases will be present in the spectrum at this point. The frequency planning described above, however, ensures that the channel of interest is not distorted. It is contemplated, however, that some noise from mixer 116 and AGC 118 will also fold from the aliases into the channel of interest. According to this embodiment of the invention, however, no band pass filtering is needed within subsampling receiver 50" in the intermediate frequency band (i.e., after mixer 116). Because of the band-limiting of noise performed by RF SAW filter 114, however, it is contemplated that the noise folded into the channel of interest, due primarily to mixer 116 and AGC 118, will be relatively small (e.g., on the order of 0.3 dB).

Analog FIR filter 122 receives the sampled analog signals from sample-and-hold circuit 120. According to this embodiment of the invention, analog FIR 122 reduces the level of adjacent channel interference, and applies its output to switched capacitor amplifier (SCA) 124. The combination of FIR 122 and SCA 124 is to reduce the dynamic range of the sampled analog signals to a range that can be readily digitized by ADC 130, of reasonable complexity. For example, it is contemplated that the dynamic range of the signal at the output of SCA 124 is on the order of 55 dB.

Figure 10:
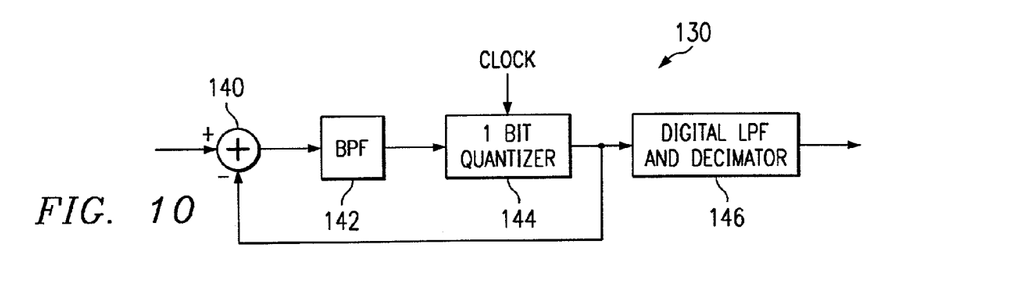
FIG. 10 is an electrical diagram, in block form, illustrating a band-pass analog-to-digital converter as used in the subsampling receiver of the third preferred embodiment of the invention.

ADC 130 according to this embodiment of the invention is a band-pass Σ-Δ analog-to-digital converter, digitizing at sampling frequency $f_s$ (e.g., 120 MHz), which is of course the same frequency at which sample-and-hold circuit 120 samples the intermediate frequency signal. Referring now to FIG. 10, the construction of ADC 130 according to this embodiment of the invention will now be described.

ADC 130 receives an input signal at the non-inverting input of comparator 140; a feedback signal is applied to the inverting input of comparator 140, as will be noted below. The output of comparator 140, presenting a signal corresponding to the difference between the input signal and the feedback signal, is band-pass filtered by bandpass filter 142, and then applied to 1-bit quantizer 144. Quantizer 144 is a conventional 1-bit quantizer, for issuing a decision signal corresponding to the level of the bandpass filtered difference signal from comparator 140, with the decisions clocked at sampling frequency $f_s$. The quantized output is the feedback signal applied to comparator 140, and is also forwarded to digital low-pass filter and decimator 146. Considering that the quantization frequency (at $f_s$) is significantly higher than the frequency of the channel of interest (e.g., centered at about 30 MHz), the output of the quantizer will be an oversampled bitstream. Filter and decimator 146 will therefore reduce adjacent channel interference, and present a digital output corresponding to the channel of interest. It is contemplated that the digital words output by ADC 130 will have ten bits of resolution, considering an input dynamic range of on the order of 55 dB.

According to this preferred embodiment of the invention, bandpass filter 142 in ADC 130 replaces the conventional lowpass filter that is typically used in sigma-delta ADCs when the band of interest is from DC to an upper frequency limit. However, because the signal being digitized is near-baseband, rather than at baseband, bandpass filter 142 enhances the signal-to-noise ratio over the channel of interest, e.g., the 5 MHZ frequency band centered at about 30 MHz.

Referring back to FIG. 8, the digital signal from ADC 130 is applied to a pair of digital mixers 132, for generating the digital baseband output in the form of in-phase and quadrature components I, Q. Digital mixer 132I multiplies the digital output from ADC 130 with a sequence {−1, 0, +1, 0, . . . }, presented at a frequency of one-fourth the sampling frequency $f_s$. Similarly, digital mixer 132Q multiplies the digital output from ADC 130 with a sequence {0, +1, 0, −1 . . . } that is also at $f_s/4$, but which is shifted in phase 90° from the sequence applied by digital mixer 132I. The effect of digital mixers 132 is to downconvert the digital signal to baseband. The sequences are filtered by respective digital low-pass filters 134I, 134Q, to generate the output digital components I, Q, respectively, with reduced adjacent channel interference.

As before, jitter time $t_j$ for subsampling receiver 50" may be defined as:

$$t_j = \frac{10^{\left(\frac{SNR_j - 10\log OSR}{20}\right)}}{2\sqrt{2}\,\pi f_{in}}$$

where $SNR_j$ is the dynamic range of the jitter, where OSR is the ratio of the sampling frequency $f_s$ to bandwidth BW, and where $f_{in}$ is the maximum input frequency to sample and hold circuit 1210. For example, an $SNR_j$ of 50 dB, at a sampling frequency $f_s$ of 120 MHz, bandwidth of 4 MHz, and an input frequency $f_{in}$ of 90 MHz, a jitter time $t_j$ of 21 psec. This jitter time is very relaxed relative to the other embodiments of this invention, due primarily to the downconversion to the intermediate frequency. Of course, the jitter time of 21 psec is easily attainable in conventional clock circuits.

Subsampling receiver 50" provides similar advantages as the embodiments of this invention described above. In summary, this implementation eliminates the need to have an expensive, off-ship, SAW filter for the intermediate frequencies; indeed, it is apparent that no filtering in the intermediate frequencies is required at all. This significantly simplifies the design of the subsampling receiver, reduces the power consumption of the circuit, and also reduces the chip area required for the receiver and thus reducing its manufacturing cost. These benefits are attained without the usual problem of additive folded broadband noise that conventionally accumulates in subsampling applications, and in avoiding DC offset as conventionally occurs in direct conversion receivers. Subsampling receiver 50" according to this embodiment of the invention is well-suited for WCDMA communications.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A subsampling receiver, comprising:
   a first bandpass filter coupled to receive a modulated signal, the modulated signal including at least one carrier signal at radio frequencies, modulated by a payload signal having frequencies significantly lower than the carrier signal and within a first bandwidth, the first bandpass filter passing frequencies within a frequency band at least as wide as the first bandwidth in a range including the at least one carrier signal;
   a first sample and hold circuit, having an input coupled to the first bandpass filter, for sampling the modulated signal at a sampling frequency substantially lower than the frequency of the at least one carrier signal;
   a first analog to digital converter, coupled to the first sample and hold circuit, for digitizing the sampled modulated signal to produce a digital signal at a baseband frequency and corresponding to the payload signal;
   first and second digital mixers, each coupled to the output of the first analog to digital converter, for applying a sequence of varying amplitude values to the digitized sampled modulated signal at a frequency that is one-fourth of the sampling frequency; and
   first and second digital low pass filters coupled to the outputs of the first and second digital mixers, respectively;
   wherein the sequence applied by the second digital mixer is phase-shifted from the sequence applied by the first digital mixer;
   and wherein the first and second digital mixers present digital sequences corresponding to first and second components of the payload signal.

2. The receiver of claim 1, wherein the sampling frequency is at least twice the first bandwidth.

3. The receiver of claim 1, wherein the sequence applied by the second digital mixer is phase-shifted by 90° from the sequence applied by the first digital mixer so that the first and second components correspond to in-phase and quadrature components of the payload signal.

4. The receiver of claim 1, wherein the sampled modulated signal includes a plurality of aliases of the modulated signal, the plurality of aliases including a near baseband alias.

5. The receiver of claim 4, wherein the output of the first and second digital mixers correspond to first and second components of the modulated signal at the baseband frequency.

6. The receiver of claim 1, further comprising:
   a first low noise amplifier, coupled to the output of the first bandpass filter; and
   a second bandpass filter, coupled to the output of the first low noise amplifier.

7. The receiver of claim 1, further comprising:
   an analog mixer, coupled to the output of the first bandpass filter, for downconverting the modulated signal to an intermediate frequency;
   first and second digital mixers, each coupled to the output of the first analog to digital converter, for applying a sequence of varying amplitude values to the digitized sampled modulated signal at a frequency lower than the sampling frequency;
   wherein the sequence applied by the second digital mixer is phase-shifted from the sequence applied by the first digital mixer;
   and wherein the first and second digital mixers present digital sequences corresponding to first and second components of the payload signal.

8. The receiver of claim 7, wherein the first and second digital mixers are for applying the sequences of varying amplitude values at a frequency that is one-fourth of the sampling frequency;
   and wherein the sequence applied by the second digital mixer is phase-shifted by 90° from the sequence applied by the first digital mixer so that the first and second components correspond to in-phase and quadrature components of the payload signal.

9. The receiver of claim 7, wherein the analog-to-digital converter comprises:
   a comparator, for generating an error signal corresponding to a difference between the sampled modulated signal and a feedback signal;
   a bandpass filter coupled to the comparator, for filtering the error signal;
   a quantizer, for quantizing the filtered error signal; and
   a digital low pass filter, for filtering the quantized error signal;
   wherein the feedback signal corresponds to the quantized error signal.

10. A subsampling receiver comprising:
    a first bandpass filter coupled to receive a modulated signal, the modulated signal including at least one carrier signal at radio frequencies, modulated by a payload signal having frequencies significantly lower than the carrier signal and within a first bandwidth, the first bandpass filter passing frequencies within a frequency band at least as wide as the first bandwidth in a range including the at least one carrier signal;
    a first sample and hold circuit, having an input coupled to the first bandpass filter, for sampling the modulated signal at a sampling frequency substantially lower than the frequency of the at least one carrier signal;

a first analog to digital converter, coupled to the first sample and hold circuit, for digitizing the sampled modulated signal to produce a digital signal at a baseband frequency and corresponding to the payload signal;

a second sample and hold circuit having an input coupled to the first bandpass filter, for sampling the modulated signal at the sampling frequency and phase-shifted from the sampling by the first sample and hold circuit; and a second analog to digital converter, coupled to the second sample and hold circuit, for digitizing the sampled modulated signal to produce a digital signal at a baseband frequency and corresponding to the payload signal;

wherein the digital signals produced by the first and second analog to digital converters correspond to first and second components of the payload signal.

11. The receiver of claim 10, wherein the sampling by the first and second sample and hold circuits are phase-shifted from one another by 90°;

and wherein the first and second components of the payload signal correspond to in-phase and quadrature components of the payload signal.

12. The receiver of claim 10, further comprising:

first and second digital low pass filters, coupled to the output of the first and second sample and hold circuits, respectively.

13. The receiver of claim 10, further comprising:

a first low noise amplifier, coupled to the input of the first bandpass filter; and a second low noise amplifier, coupled to the output of the first bandpass filter.

14. The receiver of claim 13, wherein the second low noise amplifier is integrated into the same integrated circuit as the first and second sample and hold circuits and the first and second analog to digital converters.

15. A wireless communications unit, comprising:

an antenna;

a speaker;

a digital signal processor, for performing digital signal processing on signals received at the antenna;

an audio interface, for communicating processed received signals from the digital signal processor to the speaker; and a subsampling receiver, comprising:

a first bandpass filter coupled to receive a modulated signal from the antenna, the modulated signal including at least one carrier signal at radio frequencies, modulated by a payload signal having frequencies significantly lower than the carrier signal and within a first bandwidth, the first bandpass filter passing frequencies within a frequency band at least as wide as the first bandwidth in a range including the at least one carrier signal;

a first sample and hold circuit, having an input coupled to the first bandpass filter, for sampling the modulated signal at a sampling frequency substantially lower than the frequency of the at least one carrier signal;

a first analog to digital converter, coupled to the first sample and hold circuit, for digitizing the sampled modulated signal to produce, at an output coupled to the digital signal processor, a digital signal at a baseband frequency and corresponding to the payload signal;

a second sample and hold circuit, having an input coupled to the first bandpass filter, for sampling the modulated signal at the sampling frequency and phase-shifted by 90° from the sampling by the first sample and hold circuit; and a second analog to digital converter, coupled to the second sample and hold circuit, for digitizing the sampled modulated signal to produce a digital signal at a baseband frequency and corresponding to the payload signal;

wherein the digital signals produced by the first and second analog to digital converters correspond to in-phase and quadrature components of the payload signal.

16. The communications unit of claim 15, further comprising:

a first low noise amplifier, coupled to the input of the first bandpass filter; and a second low noise amplifier, coupled to the output of the first bandpass filter;

wherein the second low noise amplifier is integrated into the same integrated circuit as the first and second sample and hold circuits and the first and second analog to digital converters.

17. A communications unit, comprising:

an antenna;

a speaker;

a digital signal processor, for performing digital signal processing on signals received at the antenna;

an audio interface, for communicating processed received signals from the digital signal processor to the speaker; and a subsampling receiver, comprising:

a first bandpass filter coupled to receive a modulated signal from the antenna, the modulated signal including at least one carrier signal at radio frequencies, modulated by a payload signal having frequencies significantly lower than the carrier signal and within a first bandwidth, the first bandpass filter passing frequencies within a frequency band at least as wide as the first bandwidth in a range including the at least one carrier signal;

a first sample and hold circuit, having an input coupled to the first bandpass filter, for sampling the modulated signal at a sampling frequency substantially lower than the frequency of the at least one carrier signal;

a first analog to digital converter, coupled to the first sample and hold circuit, for digitizing the sampled modulated signal to produce, at an output coupled to the digital signal processor, a digital signal at a baseband frequency and corresponding to the payload signal, the first analog-to-digital converter comprising:

a comparator, for generating an error signal corresponding to a difference between the sampled modulated signal and a feedback signal;

a bandpass filter coupled to the comparator, for filtering the error signal;

a quantizer, for quantizing the filtered error signal, the feedback signal corresponding to the quantized error signal; and a digital low pass filter, for filtering the quantized error signal;

first and second digital mixers, each coupled to the output of the first analog to digital converter, for applying a sequence of varying amplitude values to the digitized sampled modulated signal at a frequency that is one-fourth of the sampling frequency;

wherein the sequence applied by the second digital mixer is phase-shifted by 90° from the sequence applied by the first digital mixer;

and wherein the first and second digital mixers present digital sequences corresponding to in-phase and quadrature components of the payload signal.

18. The communications unit of claim 17, wherein the sampling frequency is at least twice the first bandwidth.

19. The communications unit of claim 17, wherein the sampled modulated signal includes a plurality of aliases of the modulated signal, the plurality of aliases including a near baseband alias;

and wherein the output of the first and second digital mixers correspond to first and second components of the modulated signal at the baseband frequency.

20. The communications unit of claim 17, wherein the subsampling receiver further comprises:

an analog mixer, coupled to the output of the first bandpass filter, for downconverting the modulated signal to an intermediate frequency;

first and second digital mixers, each coupled to the output of the first analog to digital converter, for applying a sequence of varying amplitude values to the digitized sampled modulated signal at a frequency values at a frequency that is one-fourth of the sampling frequency;

wherein the sequence applied by the second digital mixer is phase-shifted by 90° from the sequence applied by the first digital mixer;

and wherein the first and second digital mixers present digital sequences corresponding to in-phase and quadrature components of the payload of the payload signal.

21. A method of converting a received modulated signal to a baseband payload signal, the modulated signal including at least one carrier signal at radio frequencies, modulated by a payload signal having frequencies significantly lower than the carrier signal and within a first bandwidth:, the method comprising the steps of:

bandpass filtering the modulated signal, to pass frequencies within a frequency band at least as wide as the first bandwidth in a range including the at least one carrier signal;

sampling the modulated signal at a sampling frequency substantially lower than the frequency of the at least one carrier signal; and digitizing the sampled modulated signal to produce a digital signal at a baseband frequency and corresponding to the payload signal;

applying first and second sequences of varying amplitude values to the digitized sampled modulated signal at a frequency that is one-fourth of the sampling frequency; and applying digital low-pass filters to the first and second sequences;

wherein the second sequence is phase-shifted from the first sequence, to produce first and second digital sequences corresponding to first and second components of the payload signal.

22. The method of claim 21, wherein the sampling frequency is at least twice the first bandwidth.

23. The method of claim 21, wherein the second sequence is phase-shifted by 90° from the first sequence so that the first and second components correspond to in-phase and quadrature components of the payload signal.

24. The method of claim 21, wherein the sampled modulated signal includes a plurality of aliases of the modulated signal, the plurality of aliases including a near baseband alias.

25. The method of claim 24, wherein the first and second components of the modulated signal are at the baseband frequency.

26. A method of converting a received modulated signal to a baseband payload signal, the modulated signal including at least one carrier signal at radio frequencies, modulated by a payload signal having frequencies significantly lower than the carrier signal and within a first bandwidth, the method comprising the steps of:

bandpass filtering the modulated signal, to pass frequencies within a frequency band at least as wide as the first bandwidth in a range including the at least one carrier signal;

sampling the modulated signal at a sampling frequency substantially lower than the frequency of the at least one carrier signal to produce a first sampled sequence of the modulated signal; and also sampling the modulated signal at a phase-shifted version of the sampling frequency to produce a second sampled sequence of the modulated signal, phase-shifted from the first sampled sequence;

digitizing the first and second sampled sequences to produce a digital signal at a baseband frequency and corresponding to first and second components of the payload signal.

27. The method of claim 26, wherein first and second components of the payload signal correspond to in-phase and quadrature components of the payload signal.

* * * * *